United States Patent [19]

Kark

[11] 4,099,311
[45] Jul. 11, 1978

[54] COMPOSITE ROLL WITH ROLL RING OF MATERIAL WHICH IS SENSITIVE TO TENSILE STRESS

[76] Inventor: Uwe Kark, Cuxhavener Str. 60a, 2104 Hamburg 92 Hausbruch, Fed. Rep. of Germany

[21] Appl. No.: 767,731

[22] Filed: Feb. 11, 1977

[30] Foreign Application Priority Data

Feb. 20, 1976 [DE] Fed. Rep. of Germany ....... 2606908

[51] Int. Cl.² ............................................. B21B 31/08
[52] U.S. Cl. ........................................ 29/126; 29/125
[58] Field of Search ............... 29/123, 110, 125, 129.5, 29/132, 130, 126

[56] References Cited

U.S. PATENT DOCUMENTS

| | | | |
|---|---|---|---|
| 1,468,557 | 9/1923 | Cline | 29/125 X |
| 1,586,100 | 5/1926 | Meyer | 29/125 X |
| 2,446,211 | 8/1948 | Clark | 29/125 X |
| 3,995,353 | 12/1976 | Wilson | 29/125 X |

Primary Examiner—Alfred R. Guest
Attorney, Agent, or Firm—Prutzman, Hayes, Kalb & Chilton

[57] ABSTRACT

A composite roll with an inner core, an outer roll ring and an intermediate annular arrangement of axially extending tapered wedges having axially spaced radially inward and outward projections engaging the inner core and outer roll ring.

6 Claims, 1 Drawing Figure

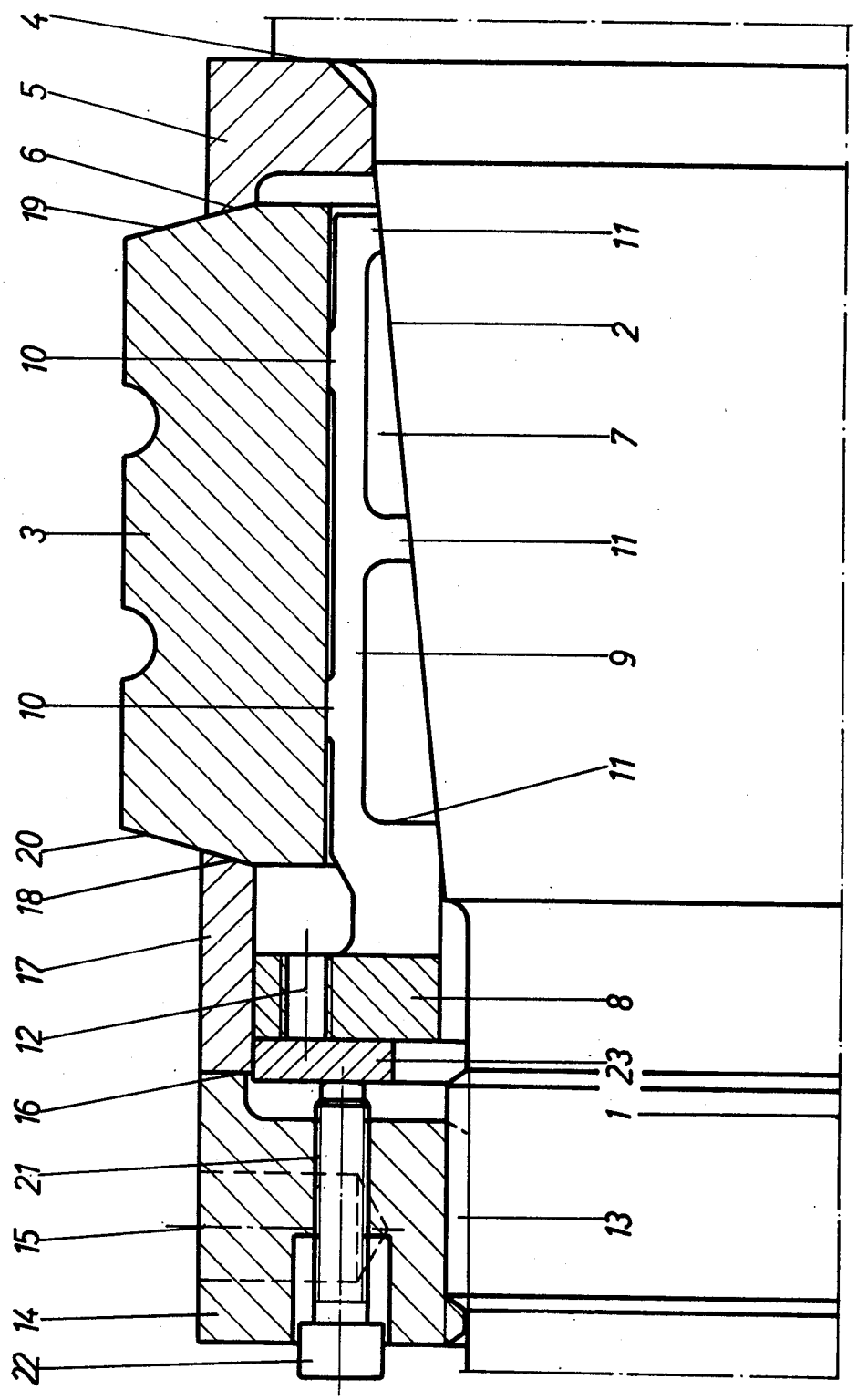

COMPOSITE ROLL WITH ROLL RING OF MATERIAL WHICH IS SENSITIVE TO TENSILE STRESS

The invention relates to a composite roll in which a roll ring of material which is sensitive to tensile stress is mounted on the roll core by means of a taper sleeve.

It is known to construct rolls, for example more particularly for the rolling of steel, of several parts consisting of different materials. In this way, the different conditions made on the material of different parts of the roll can be more readily met. Usually, the core of such composite rolls is produced from steel which can withstand the forces and loadings that occur in rolling but has the disadvantage of limited wear resistance. It is therefore known to embody the roll surface in the form of a hard i.e. carbide metal ring which is built on to the roll core. Such composite rolls also permit the use of worn chill-cast rolls as roll core. However, hard metal is very brittle and is very sensitive to tensile stresses. In operation, the roll core usually has a temperature which is higher than that of the well cooled roll ring and therefore expands more than the said ring. If the roll ring is rigidly clamped, for example by shrinkage, adhesive joining or by means of taper sleeves, it is possible that the tensile stresses resulting from the different thermal expansion in the roll ring cause the latter to burst except in the case of rolls of very small diameter (German Offenlegungschrift No. 2,449,562). Designs have therefore been developed in which the roll ring is retained by axial clamping (German Auslegeschrift No. 1,286,490; German Offenlegungsschrift No. 1,948,424). Supplementary radial support must be provided since such axial clamping is not always sufficient so that the problem of different radial thermal expansion has not been eliminated. It is also known to construct the roll core in hollow form and to thrust it against the roll ring by positive pressure which acts in the cavity (German Offenlegungsschrift No. 2,314,502) or by applying corresponding radial prestress (German Offenlegungsschrift No. 1,961,942). The problem of different thermal expansions is not eliminated thereby. The presence of a liquid pressure medium may even exacerbate the problem.

These methods, which are not unlike the shrinkage method, call for highly accurate machining of the cooperating seat surfaces of the roll ring and roll core in the same way as the shrinkage method, a feature associated with substantial costs.

It is therefore the object of the invention to provide a composite roll in which the roll ring is reliably supported in the radial direction and in which no excessive tensiles stresses occur even if the roll core on the roll ring is heated.

The solution according to the invention is based on the principle that dimensioning of the retaining forces independently of manufacturing tolerances is possible only if the roll ring is retained by means of a taper sleeve. When using such a taper sleeve the solution according to the invention consists in the taper sleeve being constructed as a radial spring.

Reliable retention of the roll ring can be achieved by using such a radial spring with a corresponding magnitude of spring force, namely for a wide range of operating conditions such as roll size, roll pressure, thermal expansion characteristics of the roll core and ring, tensile strength of the roll ring and the like. According to the invention, provision can be made for the magnitude of spring force of the radial spring to be adjustable so as to permit adaptation to the different dimensional conditions, which can be defined by manufacturing tolerances, and to different operating conditions without need for changing the radial spring. By virtue of the spring action, the roll ring is not only retained in the radial direction. Owing to the frictional forces between the roll core, taper sleeve and roll ring, which said forces increase with the magnitude of spring force, the roll ring is also prevented from performing axial displacements and rotating motions relative to the roll core.

One advantageous embodiment is characterized in that the exterior and the interior of the taper sleeve is provided with support projections which are offset relative to each other. The sleeve part situated between the said support projections that bear on the roll core or on the roll ring functions as a spring member. Advantageously, the support projections are of annular shape. They can however also be arranged axially parallel, helically or in spot configuration. It is also advantageous that the longitudinal section of the sleeve part that supports the support projections extends substantially rectilinearly. By this step it is possible to avoid parts of the taper sleeve inserted into the space between the roll ring and roll core being so deformed as to produce a spring force which is irregular over the region of the taper sleeve or that the spring force could no longer be clearly calculated from the force applied to insert the sleeve. Compared to an unslotted taper sleeve the spring action can be improved in accordance with the invention by virtue of the taper sleeve being longitudinally slit.

The radial spring force in one advantageous embodiment can be accurately metered by providing the taper sleeve with a stressing device which incorporates means for the attachment of a device for measuring the stressing force or the stressing distance.

Insertion of the taper sleeve should provide clearly defined conditions, including those regarding the position of the associated components, so that the spring force applied by the sleeve can be defined as reliably as possible by the force required for insertion. It is therefore advantageous to preadjust the roll ring by means which are separate of the taper sleeve. Centred rings, which flank the roll ring on both sides and are axially compressed, can be used to this end so that the roll ring is centred by means of sloping flanks. These rings also seal the space between the roll ring and the parts for retaining the same against the cooling medium.

A particularly simple construction of the composite roll is obtained by a stressing device for the axial damping of the roll ring and the independent clamping of the taper sleeve. This combined stressing device can comprise a stressing ring which is disposed on screwthreading of the roll core and on the one hand acts directly on the rings which centre the roll ring and on the other hand contains screw fasteners for stressing the cone sleeve after centring the roll ring.

One advantageous embodiment is illustrated hereinbelow in the accompanying drawing, the single FIGURE of which shows a longitudinal section of part of a composite roll according to the invention.

The roll core 1 forms a taper 2 in whose region the roll ring 3 is to be mounted. The larger end of the taper surface 2 is adjoined by a collar 4 on which a ring 5 bears axially, which said ring is centred on the roll core and is defined on the taper side by a sloping shoulder 6.

The taper sleeve, generally comprising a sleeve portion designated with the numeral 7 and a ring 8 in integral configuration, is situated on the taper surface 2 of the roll core 1. The sleeve portion is slit 11 times in the longitudinal direction. The illustrated longitudinal section extends through one of such slits and is therefore not hatched in the region of the sleeve. The ring 8 retains together the sleeve parts which are separated by the slits.

The sleeve part 7 comprises a hollow cylindrical member 9 supporting on its external circumference annular peripheral projections 10 and annular peripheral projections 11 on the internal circumference. The outer and inner projections are offset in the axial direction. Every group of two inner and one outer projection forms a radial spring because the hollow cylindrical sleeve part is able to yield flexurally when oppositely oriented forces act on the outer and inner projections. The outer projections 10 of the sleeve are situated in a cylindrical surface which corresponds to the bore of the roll ring 3. The bore of the roll ring 3 could of course also be constructed in tapered form; however, an embodiment in which the conicity is confined to the roll core is preferred in the interests of the tensile properties of the roll core and in the interests of convenient manufacture of the roll ring. The ring 8 of the taper sleeve projects radially outwardly into the region of the roll ring 3 beyond the cylinder surface which is defined by the projections 10. In this region the ring is provided with tapped holes 12 which, after the insertion of screw fasteners, serve for the extraction of the sleeve when the roll ring is dismantled.

Screwthreading is provided on the roll core at a distance from and adjoining the thinner end of the taper surface 2. Said screwthreading supports a screwthreaded collar 14 the circumference of which is provided with bores 15 to enable a tool to act thereon for screw-mounting the said collar. On its side nearest to the roll ring 3 the said collar forms an abutment surface 16 adapted to cooperate with a collar 17 which is centred on the sleeve ring 8 and whose flank 18 nearest to the roll ring 3 extends at an angle equal to that of the flank 6 of the ring 5. The roll ring 3 is clamped between the said flanks by means of correspondingly sloping side surfaces 19 and 20 and can be centred independently of the action of the sleeve 7.

The screwthreaded collar 14 contains tapped holes 21 with screw fasteners 22 which act on a thrust ring 23 that precedes the sleeve ring 8 and is intended to transmit the forces of the screw fasteners 22 to the sleeve ring 8 and to protect the latter.

After producing the arrangement illustrated in the drawing, the system is assembled by first stressing the screwthreaded collar 14 against the system so that the roll ring 3 is centred between the centring rings 5 and 17. The firm and sealing-tight connection thus produced between the centring rings and the roll ring is retained in subsequent operation and seals the spaces enclosed between the roll ring and the components retaining the latter. The screw fasteners 22 are then uniformly tightened while the torque or rotating path required for tightening is measured until the sleeve 7 has reached a position which has been defined by prior calculation as ensuring the necessary radial stress for retaining the roll ring.

I claim:

1. A composite roll comprising a coaxial inner roll core and an outer roll ring generally defining an axially tapered annulus therebetween, and intermediate axially tapered means within the axially tapered annulus between and in engagement with the roll core and roll ring for supporting the roll ring on the core, the intermediate axially tapered means being engageable with the inner core and outer roll ring at spaced offset supporting areas respectively and the intermediate axially tapered means forms spring-like means therebetween for resiliently biasing the roll ring radially outwardly at the supporting areas of engagement with the roll ring.

2. A composite roll according to claim 1 further comprising adjustment means for axially adjusting the axially tapered means between the core and roll ring for adjusting the radial outward bias on the roll ring.

3. A composite roll according to claim 1 wherein the axially tapered means comprises an annular arrangement of a plurality of axially extending tapered wedges between the inner roll core and outer roll ring.

4. A composite roll according to claim 1 wherein the axially tapered means has a plurality of radial inward and outward offset supporting projections engaging the inner roll core and outer roll ring respectively.

5. A composite roll according to claim 1 wherein the axially tapered means and inner core have a first plurality of axially spaced areas of engagement and the axially tapered means and outer roll ring have a second plurality of axially spaced areas of engagement axially intermediate the first areas of engagement.

6. A composite roll according to claim 1 further comprising end rings mounted on the roll core at opposite ends of the roll ring, the end rings and roll ring having conforming generally axially opposed, conical engagement surfaces respectively.

* * * * *